United States Patent
Clark et al.

(10) Patent No.: US 10,859,155 B2
(45) Date of Patent: Dec. 8, 2020

(54) GEARBOX AND A GEARED GAS TURBINE ENGINE

(71) Applicant: ROLLS-ROYCE plc, London (GB)

(72) Inventors: Daniel Clark, Derby (GB); Andrew R Ramshaw, Rutland (GB); Peter J Dixon, Derby (GB)

(73) Assignee: ROLLS-ROYCE plc, London (GB)

( * ) Notice: Subject to any disclaimer, the term of this patent is extended or adjusted under 35 U.S.C. 154(b) by 70 days.

(21) Appl. No.: 16/433,068

(22) Filed: Jun. 6, 2019

(65) Prior Publication Data
US 2019/0376596 A1    Dec. 12, 2019

(30) Foreign Application Priority Data
Jun. 7, 2018  (GB) .................................. 1809373.2

(51) Int. Cl.
*F16H 57/08*    (2006.01)
*F01D 25/18*    (2006.01)
(Continued)

(52) U.S. Cl.
CPC .......... *F16H 57/082* (2013.01); *F01D 25/18* (2013.01); *F02C 7/36* (2013.01); *F02K 3/06* (2013.01);
(Continued)

(58) Field of Classification Search
None
See application file for complete search history.

(56) References Cited

U.S. PATENT DOCUMENTS 5,851,163 A * 12/1998 Kawase ............... F16H 13/08
475/183
7,704,178 B2 * 4/2010 Sheridan ............ F16H 57/0482
475/159
(Continued)

FOREIGN PATENT DOCUMENTS

CN      206958226 U     2/2018
DE    102015213723 A1    1/2017
(Continued)

OTHER PUBLICATIONS

Nov. 22, 2018 Search Report issued in British Application No. GB1809373.2.
(Continued)

*Primary Examiner* — Dirk Wright
(74) *Attorney, Agent, or Firm* — Oliff PLC

(57) ABSTRACT

A gearbox includes a sun gear, a plurality of planet gears, an annulus gear and a planet carrier. The planet carrier includes a first ring, second ring spaced axially from the first ring, a plurality of circumferentially spaced axles and a plurality of circumferentially spaced support structures extending axially between and secured to the first ring and second ring. Each planet gear is rotatably mounted on a respective one of the axles. The first ring has a plurality of circumferentially spaced recesses and the second ring has a plurality of circumferentially spaced recesses. Each recess in the second ring is aligned with a corresponding one of the recesses in the first ring. A first end of each support structure locates in a recess in the first ring. A second end of each support structure locates in a recess in the second ring. Each support structure comprises a fused powdered material.

22 Claims, 6 Drawing Sheets

(51) Int. Cl.
*F02C 7/36* (2006.01)
*F02K 3/06* (2006.01)
*F16H 1/28* (2006.01)
*F16H 57/04* (2010.01)

(52) U.S. Cl.
CPC ............ *F16H 1/28* (2013.01); *F16H 57/043* (2013.01); *F16H 57/0479* (2013.01); *F16H 57/0486* (2013.01); *F05D 2220/32* (2013.01); *F05D 2260/40311* (2013.01); *F05D 2260/98* (2013.01)

(56) References Cited

U.S. PATENT DOCUMENTS

| | | | |
|---|---|---|---|
| 8,777,792 B2* | 7/2014 | Imai | F16H 57/0486 475/159 |
| 9,038,779 B2* | 5/2015 | McCune | F16H 57/0423 184/6.11 |
| 9,121,491 B2* | 9/2015 | Hancox | F16H 57/043 |
| 9,777,825 B2* | 10/2017 | Sheridan | F01D 25/18 |
| 10,202,902 B2* | 2/2019 | McCune | F02C 7/36 |
| 10,724,445 B2* | 7/2020 | Sheridan | F16H 1/28 |
| 2002/0050064 A1 | 5/2002 | Furuse et al. | |
| 2005/0146162 A1 | 7/2005 | Gerick et al. | |
| 2013/0102432 A1 | 4/2013 | Imai et al. | |
| 2015/0065285 A1 | 3/2015 | McCune et al. | |
| 2016/0258297 A1 | 9/2016 | Cortequisse | |
| 2017/0057558 A1 | 3/2017 | Hillebrecht et al. | |
| 2017/0152658 A1 | 6/2017 | Schaefer et al. | |
| 2017/0154150 A1 | 6/2017 | Schaefer | |
| 2017/0219086 A1 | 8/2017 | Brownell et al. | |
| 2018/0010525 A1 | 1/2018 | Madge | |
| 2018/0016938 A1 | 1/2018 | Doorbar et al. | |
| 2019/0271385 A1* | 9/2019 | Baraggia Au Yeung | F16H 57/0423 |
| 2020/0025068 A1* | 1/2020 | McCune | F02C 3/107 |

FOREIGN PATENT DOCUMENTS

| | | |
|---|---|---|
| EP | 2559914 A1 | 2/2013 |
| EP | 3270009 A1 | 1/2018 |
| WO | 2015/031185 A1 | 3/2015 |

OTHER PUBLICATIONS

Sep. 25, 2019 Search Report issued in European Patent Application No. 19178261.

* cited by examiner

GEARBOX AND A GEARED GAS TURBINE ENGINE

The present disclosure relates to a gearbox, a geared gas turbine engine and in particular to a geared gas turbine engine for an aircraft.

Geared gas turbine engines comprise a gearbox to drive a fan, or a propeller, and the gearbox comprises a planet carrier to hold the planet gears of the gearbox. Conventionally the planet carrier of the gearbox is a solid steel structure. There is a requirement for a geared gas turbine engine with greater power and a gearbox which must transmit greater power and hence a planet carrier which must have considerable strength and hence weight in order to carry the loads and torque applied to the planet carrier in operation of the geared gas turbine engine.

Accordingly the present disclosure seeks to provide a novel geared gas turbine engine which reduces or overcomes the above mentioned problem.

According to a first aspect there is provided a gearbox comprising a sun gear, a plurality of planet gears, an annulus gear and a planet carrier, the sun gear meshing with the planet gears and the planet gears meshing with the annulus gear, the planet carrier comprising a first ring, a second ring spaced axially from the first ring, a plurality of circumferentially spaced axles extending axially between the first ring and the second ring and a plurality of circumferentially spaced support structures extending axially between the first ring and the second ring, each planet gear being rotatably mounted on a respective one of the axles, each support structure being arranged circumferentially between two planet gears, the first ring has a plurality of circumferentially spaced recesses in a surface facing the second ring, the second ring has a plurality of circumferentially spaced recesses in a surface facing the first ring, each recess in the second ring being aligned circumferentially and radially with a corresponding one of the recesses in the first ring, a first axial end of each support structure locating in a respective one of the recesses in the first ring, a second axial end of each support structure locating in a respective one of the recesses in the second ring, each support structure being secured to the first ring and the second ring and each support structure comprising fused/sintered powdered material.

The first ring may comprise a metal for example steel, titanium, a titanium alloy, nickel, nickel alloy, cobalt, a cobalt alloy, aluminium or aluminium alloy. The first ring may comprise a metal matrix composite for example a metal matrix material comprising reinforcing particles in a metal matrix, e.g. an aluminium metal matrix composite. The first ring may comprise a forged steel ring, a forged titanium alloy ring or a cast aluminium metal matrix composite ring.

The second ring may comprise a metal for example steel, titanium, a titanium alloy, nickel, nickel alloy, cobalt, a cobalt alloy, aluminium or aluminium alloy. The second ring may comprise a metal matrix composite for example a metal matrix material comprising reinforcing particles in a metal matrix, e.g. an aluminium metal matrix composite. The second ring may comprise a forged steel ring, a forged titanium alloy ring or a cast aluminium metal matrix composite ring. The second ring may comprise the same material as the first ring.

The support structures may comprise a metal for example steel, titanium, a titanium alloy, nickel, nickel alloy, cobalt, a cobalt alloy, aluminium or aluminium alloy. The support structures may comprise the same material as the first ring and the second ring. The support structures may comprise reinforcing material. The reinforcing material may comprise ceramic particles or short fibres. The support structures may be manufactured by additive layer manufacturing.

A first shaft may extend axially from the first ring. The first shaft may comprise a metal matrix composite. A composite material may be arranged around and abutting the first shaft. The first shaft may comprise the same material as the first ring.

A second shaft may extend axially from the second ring. The second shaft may comprise a metal matrix composite. A composite material may be arranged around and abutting the second shaft. The second shaft may comprise the same material as the second ring.

Each support structure may be secured to the first ring and the second ring by at least one fastener extending axially through the support structure. Each support structure may be secured to the first ring and the second ring by at least one pre-tensioned fastener extending axially through the support structure. Each support structure may be secured to the first ring and the second ring by two fasteners extending axially through the support structure. Each support structure may be secured to the first ring and the second ring by two pre-tensioned fasteners extending axially through the support structure. Each fastener may extend through a respective aperture in the support structure and respective apertures in the first ring and the second ring. Each fastener may comprise a metal for example steel, titanium, titanium alloy, nickel, nickel alloy, cobalt or cobalt alloy. Each fastener may comprise a metal matrix composite for example steel, titanium, titanium alloy, nickel, nickel alloy, cobalt or cobalt alloy metal matrix composite.

Each support structure may be secured to the first ring and the second ring by a least one metal matrix composite tube extending axially through the support structure. Each metal matrix composite tube may extend through a respective aperture in the support structure.

The recesses may extend axially all the way through the first ring and the second ring. The first and second axial ends of each support structure may have end portions which have smaller dimensions than the remainder of the support structure to define ledges, and the ledges abutting the surfaces of the first and second rings.

The first and second axial ends of each support structure may have end portions which form plugs, the recesses in the first and second rings form sockets, the plugs of each support structure locating in a respective one of the sockets in the first ring and a respective one of the sockets in the second ring. The plugs and sockets may be of the bayonet type in which each support structure is rotatable about an axis parallel to the axis of the rings to lock the support structure in position. The plugs and sockets may be circular in cross-section. The first and second axial ends of each support structure may have end portions which form tenons, the recesses in the first and second rings form mortices, the tenons of each support structure locating in a respective one of the mortices in the first ring and a respective one of the mortices in the second ring.

Each support structure being generally wedge shaped in cross-section in a plane perpendicular to the axis of the gearbox.

Each support structure may have one or more internal passages for the supply of lubricant to the planet gears and/or the sun gear of the gearbox and one or more internal passages for the collection of lubricant from the planet gears and/or the sun gear of the gearbox.

Each support structure may comprise first and second axially spaced walls, third and fourth circumferentially spaced walls interconnecting the first and second walls, fifth and sixth radially spaced walls interconnecting the first and second walls and interconnecting the third and fourth walls, the fourth wall being longer than the third wall and extending radially inwardly of the sixth wall to define a lubricant baffle, a pillar interconnecting the first and second walls, the pillar being spaced radially from a radially inner end of the third wall, the pillar being spaced circumferentially from a radially inner end of the fourth wall to define a lubricant collection chamber.

Each support structure may have a lubricant collection passage extending axially there-through and at least one lubricant scavenge passage extending from the lubricant collection passage to an opening in the sixth wall. Each support structure may have a plurality of lubricant scavenge passages extending from the lubricant collection passage to respective openings in the sixth wall. The lubricant scavenge passages may be axially spaced apart. The aperture in the support structure for the fastener or the metal matrix composite tube may have a keyhole cross-section to define the lubricant passage.

Each support structure may have a lubricant supply passage extending axially through the pillar, and at least one lubricant aperture extending from the lubricant supply passage to a surface of the pillar facing a planet gear of the gearbox and/or a surface of the pillar facing the sun gear of the gearbox. Each support structure may have a plurality of lubricant apertures extending from the lubricant supply passage to the surface of the pillar facing the planet gear of the gearbox and/or the surface of the pillar facing the sun gear of the gearbox. The lubricant apertures may be axially spaced apart.

Each support structure may have a lubricant supply passage extending axially through a radially inner end of the fourth wall, and at least one lubricant aperture extending from the lubricant supply passage to a surface of the fourth wall facing a planet gear of the gearbox and/or a surface of the fourth wall facing the sun gear of the gearbox. Each support structure may have a plurality of lubricant apertures extending from the lubricant supply passage to the surface of the fourth wall facing the planet gear of the gearbox and/or the surface of the fourth wall facing the sun gear of the gearbox. The lubricant apertures may be axially spaced apart.

There may be at least one lubricant pipe extending axially through each support structure. The at least one lubricant pipe in each support structure may provide reinforcement to the support structure.

The third and fourth circumferentially spaced wall of each support structure may be arcuate. The third and fourth walls circumferentially spaced wall may be concave, e.g. the third and fourth walls curve towards each other. The third and fourth walls are arcuate, or shaped, to fit between the planet gears of the gearbox.

The first ring may have a plurality of indentations in the surface facing the second ring and/or the second ring may have a plurality of indentations in the surface facing the first ring. The indentations may be circular in cross-section. The indentations may have a constant radius throughout their depth. The indentations may have an increasing radius with increasing depth. The first ring may have a plurality of arcuate indentations in the surface facing the second ring and/or the second ring may have a plurality of arcuate indentations in the surface facing the first ring. The arcuate indentations may have a concave surface facing away from the axis of the first ring and/or the second ring. The first ring may have a plurality of half-circular, quarter-circular or tear-drop shape indentations in the surface facing the second ring and/or the second ring may have a plurality of half-circular, quarter-circular or tear-drop shape indentations in the surface facing the first ring.

The first ring may have a plurality of projections extending from the surface facing the second ring and/or the second ring may have a plurality of projections extending away from the surface facing the first ring. The first ring may have a plurality of cup shape projections extending from the surface facing the second ring and/or the second ring may have a plurality of cup shape projections extending away from the surface facing the first ring. The projections may be circular in cross-section. The projections may have a constant internal radius throughout their depth. The projections may have an increasing internal radius with increasing depth. The first ring may have a plurality of arcuate projections extending from the surface facing the second ring and/or the second ring may have a plurality of arcuate projections extending away from the surface facing the first ring. The arcuate projections may have a concave surface facing away from the axis of the first ring and/or the second ring.

According to a second aspect there is provided a gas turbine engine for an aircraft comprising:
 an engine core comprising a turbine, a compressor, and a core shaft connecting the turbine to the compressor;
 a fan located upstream of the engine core, the fan comprising a plurality of fan blades; and
 a gearbox that receives an input from the core shaft and outputs drive to the fan so as to drive the fan at a lower rotational speed than the core shaft, wherein:
the gearbox comprising a sun gear, a plurality of planet gears, an annulus gear and a planet carrier, the sun gear meshing with the planet gears and the planet gears meshing with the annulus gear, the planet carrier comprising a first ring, a second ring spaced axially from the first ring, a plurality of circumferentially spaced axles extending axially between the first ring and the second ring and a plurality of circumferentially spaced support structures extending axially between the first ring and the second ring, each planet gear being rotatably mounted on a respective one of the axles, each support structure being arranged circumferentially between two planet gears, the first ring has a plurality of circumferentially spaced recesses in a surface facing the second ring, the second ring has a plurality of circumferentially spaced recesses in a surface facing the first ring, each recess in the second ring being aligned circumferentially and radially with a corresponding one of the recesses in the first ring, a first axial end of each support structure locating in a respective one of the recesses in the first ring, a second axial end of each support structure locating in a respective one of the recesses in the second ring, each support structure being secured to the first ring and the second ring, and each support structure comprising fused/sintered powdered material.

The turbine may be a first turbine, the compressor is a first compressor, and the core shaft is a first core shaft;
 the engine core further comprises a second turbine, a second compressor, and a second core shaft connecting the second turbine to the second compressor; and
 the second turbine, second compressor, and second core shaft are arranged to rotate at a higher rotational speed than the first core shaft.

According to a third aspect there is provided a method of assembling a gearbox comprising manufacturing a sun gear, manufacturing a plurality of planet gears, manufacturing an annulus gear, manufacturing a plurality of axles, manufacturing a plurality of support structures and manufacturing a planet carrier, the manufacturing of the planet carrier comprising manufacturing a first ring and a second ring, providing a plurality of circumferentially spaced apertures extending axially through the first ring, providing a plurality of circumferentially spaced recesses in a surface of the first ring to subsequently face the second ring, each recess in the first ring being located circumferentially between two apertures in the first ring, providing a plurality of circumferentially spaced apertures extending axially through the second ring, providing a plurality of circumferentially spaced recesses in a surface of the second ring to subsequently face the first ring, each recess in the second ring being located circumferentially between two apertures in the second ring, the manufacturing of the each support structure comprising fusing/sintering of powdered material by additive layer manufacture, aligning each planet gear with a respective one of the apertures in the first ring, locating each axle in a respective one of the apertures in the first ring and within the associated planet gear to rotatably mount each planet gear on a respective one of the axles, locating a first axial end of each support structure in a respective one of the recesses in the first ring and arranging each support structure circumferentially between two planet gears, arranging the second ring such that each aperture is aligned circumferentially and radially with a corresponding one of the apertures in the first ring and each recess in the second ring is aligned circumferentially and radially with a corresponding one of the recesses in the first ring, moving the first ring and second relatively towards each other, locating each axle in a respective one of the apertures in the second ring such that the axles extend axially between the first ring and the second ring and locating a second axial end of each support structure in a respective one of the recesses in the second ring such that the support structures extend axially between the first ring and the second ring, securing each support structure to the first ring and the second ring, and arranging the sun gear to mesh with the planet gears and arranging the planet gears to mesh with the annulus gear.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
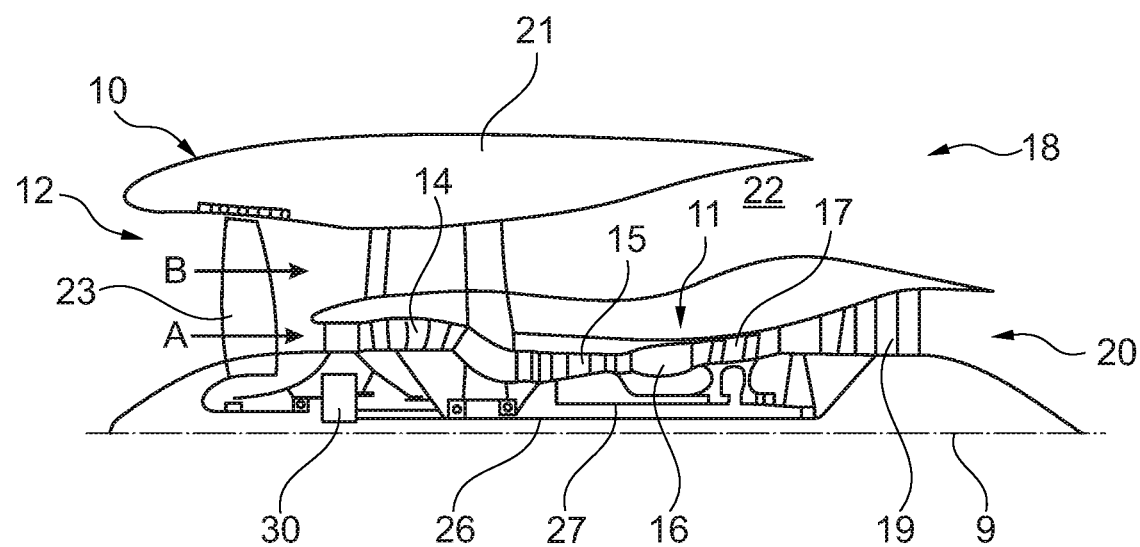
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30. In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
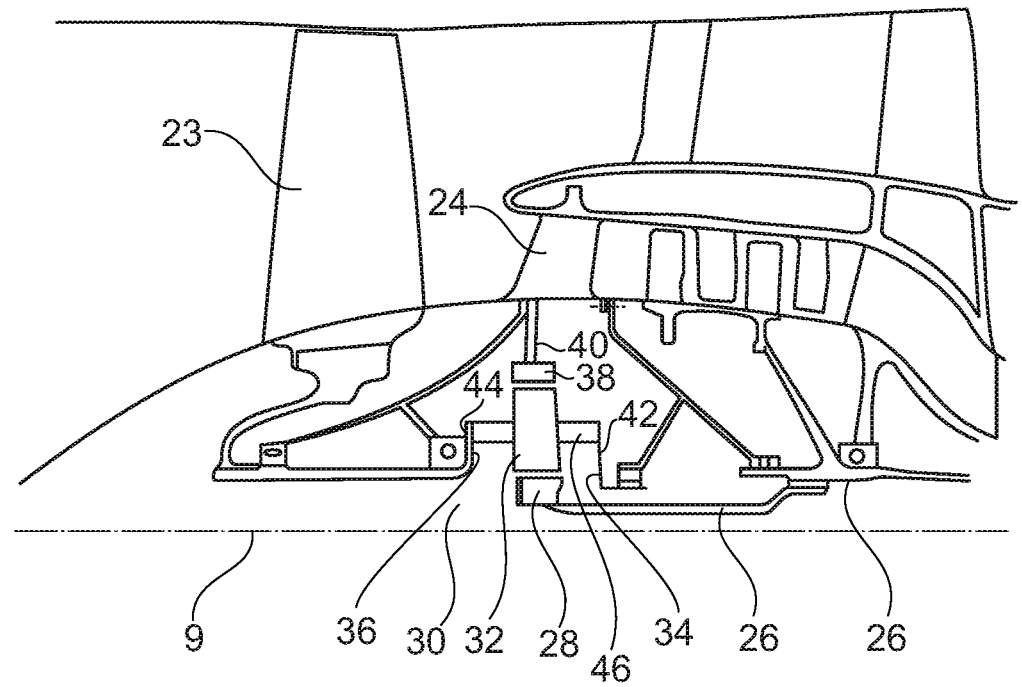
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
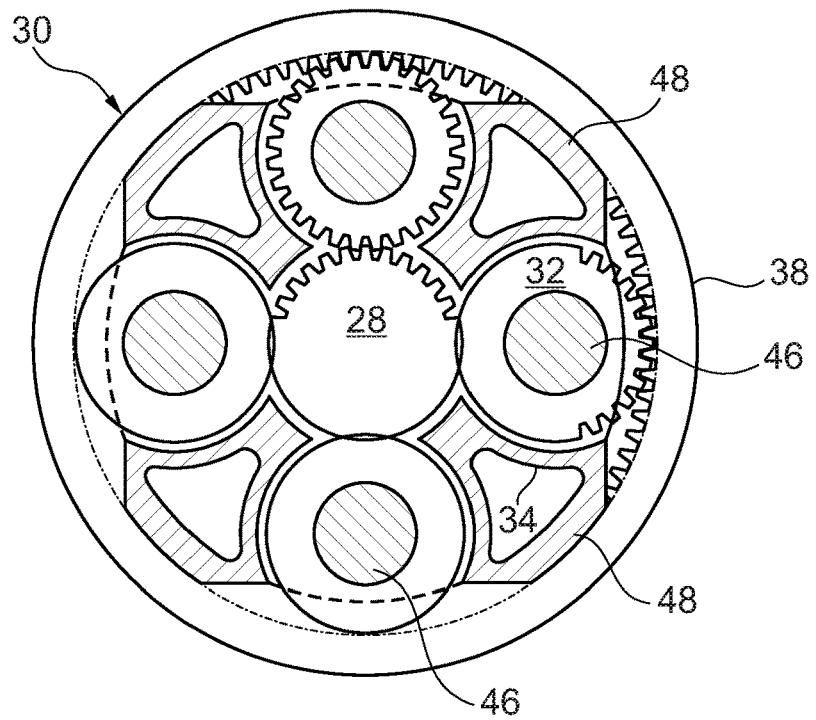
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

As mentioned previously, the gas turbine engine 10 comprises a gearbox 30. The gearbox 30 comprises a sun gear 28, a plurality of planet gears 32, an annulus gear 38 and a planet carrier 34. The sun gear 28 meshes with the planet gears 32 and the planet gears 32 mesh with the annulus gear 38. The planet carrier 34, as shown more clearly in FIGS. 4, 5 and 6 comprises a first ring 42, a second ring 44 spaced axially from the first ring 42, a plurality of circumferentially spaced axles 46 extend axially between the first ring 42 and the second ring 44 and a plurality of circumferentially spaced support structures 48 extend axially between the first ring 42 and the second ring 44. Each planet gear 32 is rotatably mounted on a respective one of the axles 46. Each support structure 48 is arranged circumferentially between two planet gears 32. The first ring 42 has a plurality of circumferentially spaced recesses 50 in a surface 56 facing the second ring 44 and the second ring 44 has a plurality of circumferentially spaced recesses 52 in a surface 58 facing the first ring 42. Each recess 52 in the second ring 44 is aligned circumferentially and radially with a corresponding one of the recesses 50 in the first ring 42. A first axial end 47 of each support structure 48 is located in a respective one of the recesses 50 in the first ring 42, a second axial end 49 of each support structure 48 is located in a respective one of the recesses 52 in the second ring 44, and each support structure 48 is secured to the first ring 42 and the second ring 44. The recesses 50 and 52 have the same shape. The recesses 50 and 52 have the same dimensions. The recesses 50 and 52 extend only part way axially through the first ring 42 and the second ring 44 respectively. Each support structure 48 comprises fused/sintered powdered material. The first ring 42 has a plurality of circumferentially spaced apertures 53, the second ring 44 has a plurality of circumferentially spaced apertures 55 and each aperture 55 in the second ring 44 is aligned circumferentially and radially with a corresponding one of the apertures 53 in the first ring 42. The axial ends of each axle 46 are located in a respective one of the apertures 53 in the first ring 42 and a respective one of the apertures 55 in the second ring.

The first ring 42 comprises a metal for example steel, titanium, a titanium alloy, nickel, nickel alloy, cobalt, a cobalt alloy, aluminium or aluminium alloy. The first ring 42 may comprise a forged steel ring or a forged titanium alloy ring. Alternatively, the first ring 42 may comprise a metal matrix composite for example a metal matrix material comprising reinforcing particles in a metal matrix, e.g. an aluminium metal matrix composite. The reinforcing particles may comprise ceramic particles. The reinforcing particles may be a different metal with a greater Young's modulus and a higher melting point. The first ring 42 may comprise a cast aluminium metal matrix composite ring.

The second ring 44 comprises a metal for example steel, titanium, a titanium alloy, nickel, nickel alloy, cobalt, a cobalt alloy, aluminium or aluminium alloy. The second ring 44 may comprise a forged steel ring or a forged titanium alloy ring. Alternatively, the second ring 44 may comprise a metal matrix composite for example a metal matrix material comprising reinforcing particles in a metal matrix, e.g. an aluminium metal matrix composite. The reinforcing particles may comprise ceramic particles. The reinforcing particles may be a different metal with a greater Young's modulus and a higher melting point. The second ring 44 may comprise a cast aluminium metal matrix composite ring. The second ring 44 may comprise the same material as the first ring 42.

Each support structure 48 is secured to the first ring 42 and the second ring 44 by at least one fastener 60 which extends axially through the support structure 48. Each support structure 48 may be secured to the first ring 42 and the second ring 44 by at least one pre-tensioned fastener 60 which extends axially through the support structure 48. Each fastener 60 extends through a respective aperture 51 in the support structure 48 and respective apertures 41 and 45 in the first ring 42 and the second ring 44 respectively. The fasteners 60 may be threaded bolts and each fastener 60 is used with a cooperating nut 62. The first and second axial ends 47 and 49 of each support member 48 have the same shape as the recesses 50 and 52 in the first and second rings 42 and 44 respectively. The first and second axial ends 47 and 49 of each support member 48 have the same dimensions as the recesses 50 and 52 in the first and second rings 42 and 44 respectively.

Figure 6:
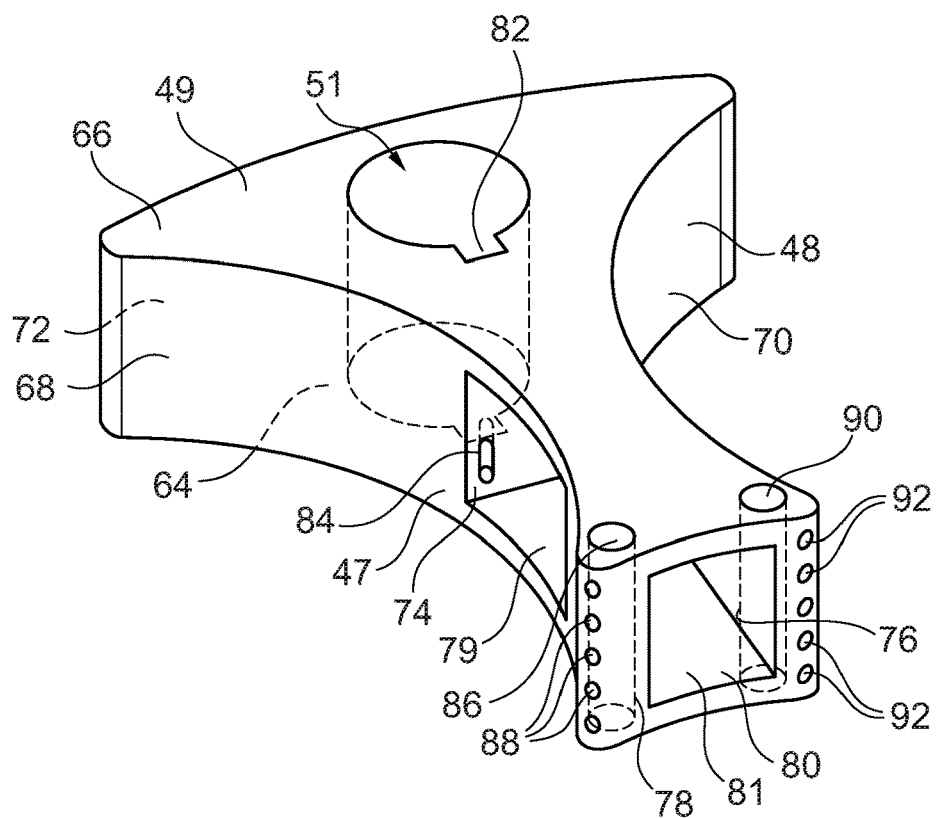
FIG. 6 is a further enlarged perspective view of a support structure for the planet carrier of the gearbox shown in FIG. 5.
Figure 5:
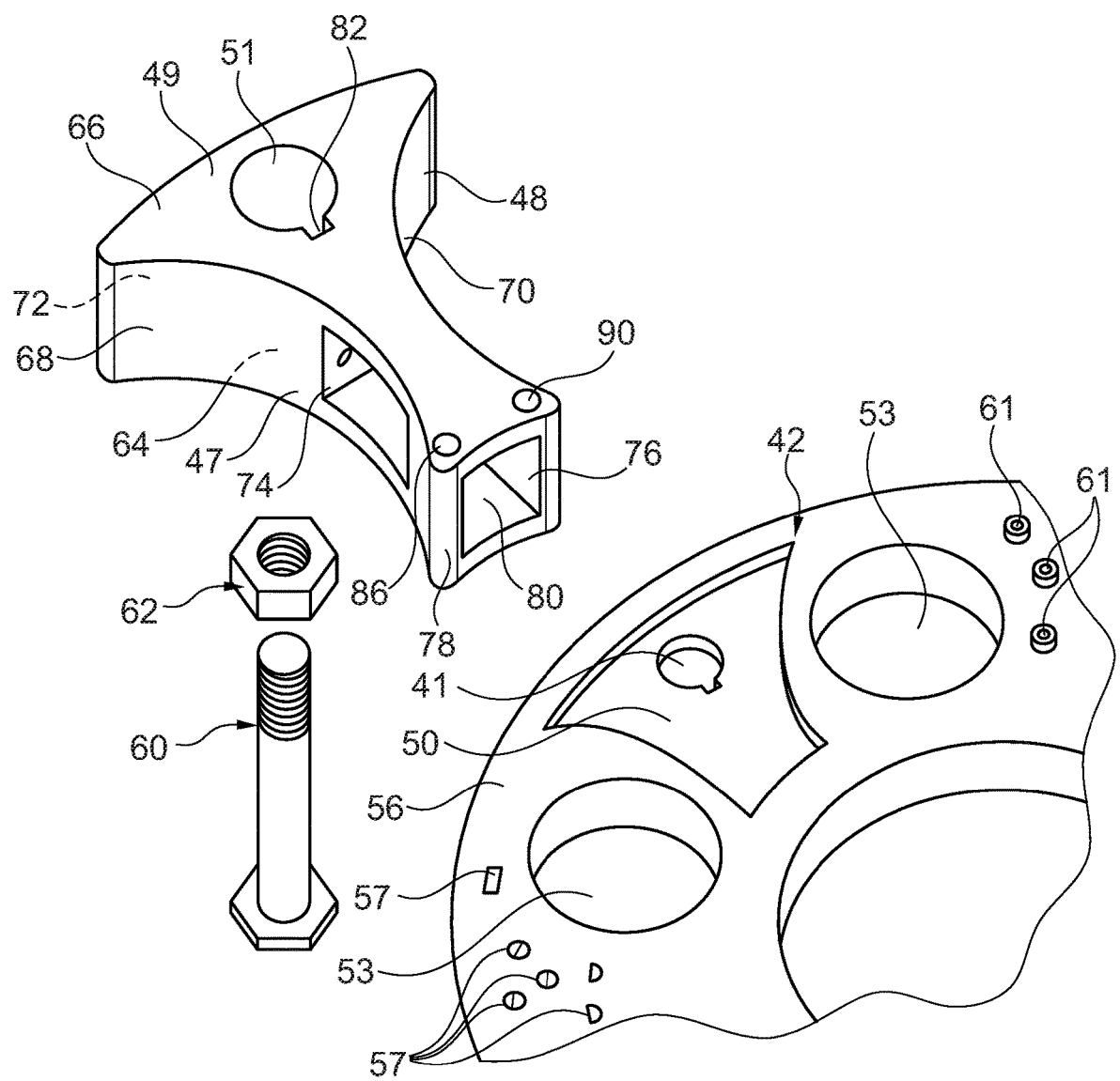
FIG. 5 is a further enlarged exploded perspective view of a portion of the planet carrier of the gearbox shown in FIG. 4.

Each support structure 48, as shown in FIGS. 5 and 6, is generally wedge shaped in cross-section in a plane perpendicular to the axis of the gearbox 30, e.g. in a plane perpendicular to the axis 9 of the gas turbine engine 10. Each support structure 48 has one or more internal passages for the supply of lubricant to the planet gears 32 and/or the sun gear 28 of the gearbox 30 and one or more internal passages for the collection of lubricant from the planet gears 32 and/or the sun gear 28 of the gearbox 30. Each support structure 48 comprises first and second axially spaced walls 64 and 66, third and fourth circumferentially spaced walls 68 and 70 which interconnect the first and second walls 64 and 66 and fifth and sixth radially spaced walls 72 and 74 which interconnect the first and second walls 64 and 66 and which interconnect the third and fourth walls 68 and 70. The fourth wall 70 is longer than the third wall 68 and extends radially inwardly of the sixth wall 74 to define a lubricant baffle 76. A pillar 78 interconnects the first and second walls 64 and 66. The pillar 78 is spaced radially from a radially inner end of the third wall 68 and the pillar 78 is spaced circumferentially from a radially inner end of the fourth wall 70 to define a lubricant collection chamber 80. Thus, there is a first opening 79 to the lubricant collection chamber 80 between the radially inner end of the third wall 68 and the pillar 78 and a second opening 81 to the lubricant collection chamber 80 between the radially inner end of the third wall 68 and the pillar 78.

Each support structure 48 has a lubricant collection passage 82 extending axially there-through and at least one lubricant scavenge passage 84 extending from the lubricant collection passage to an opening in the sixth wall 74. Each support structure 48 has a plurality of lubricant scavenge passages 84 extending from the lubricant collection passage 82 to respective openings in the sixth wall 74. The lubricant scavenge passages 84 are axially spaced apart. The aperture 51 in the support structure 48 for the fastener 60 may have a keyhole cross-section to define the lubricant collection passage 82. The lubricant collection passage 82 in each support structure 48 is an axially extending groove extending radially from the aperture 51 in the support structure 48. The lubricant collection passage 82 is defined by the axially extending groove extending radially from the aperture 51 and a radially outer surface of the fastener 60. In operation lubricant flung from the rotating planet gears 32 and the sun gear 28 travels through the first and second openings 79 and 81 of each support structure 48 into the lubricant collection chamber 80 and collects on the surface of the sixth wall 74 and the surface of the lubricant baffle 76 and then flows through the, or each, lubricant scavenge passage 84 to the lubricant collection passage 82. The lubricant collection passage 82 of each support structure 48 returns the lubricant to the lubricant system to be supplied to the gearbox 30. Each support structure 48 has a lubricant supply passage 86 extending axially through the pillar 78, and at least one lubricant aperture 88 extending from the lubricant supply passage 86 to a surface of the pillar 78 facing a planet gear 32 of the gearbox 30 and/or a surface of the pillar 78 facing the sun gear 28 of the gearbox 30 and/or a surface pillar 78 facing the region of meshing of a planet gear 32 and the sun gear 28 of the gearbox 30. Each support structure 48 has a plurality of lubricant apertures 88 extending from the lubricant supply passage 86 to the surface of the pillar 78 facing the planet gear 32 of the gearbox 30 and/or the surface of the pillar 78 facing the sun gear 28 of the gearbox 30 and/or a surface pillar 78 facing the region of meshing of a planet gear 32 and the sun gear 28 of the gearbox 30. The lubricant apertures 88 are axially spaced apart.

Each support structure 48 has a lubricant supply passage 90 extending axially through a radially inner end of the fourth wall 70 and at least one lubricant aperture 92 extending from the lubricant supply passage 90 to a surface of the fourth wall 70 facing a planet gear 32 of the gearbox 30 and/or a surface of the fourth wall 70 facing the sun gear 28 of the gearbox 30 and/or a surface of the fourth wall 70 facing the region of meshing of a planet gear 32 and the sun gear 28 of the gearbox 30. Each support structure 48 has a plurality of lubricant apertures 92 extending from the lubricant supply passage 90 to the surface of the fourth wall 70 facing the planet gear 32 of the gearbox 30 and/or the surface of the fourth wall 70 facing the sun gear 28 of the gearbox 30 and/or a surface the fourth wall 70 facing the region of meshing of a planet gear 32 and the sun gear 28 of the gearbox 30. The lubricant apertures 92 are axially spaced apart. In operation lubricant is supplied to the lubricant supply passages 86 and 88 of each support structure 48 and the lubricant is directed as jets of lubricant onto a planet gear 32, the sun gear 28 or the region of meshing of a planet gear 32 and the sun gear 28.

The third and fourth circumferentially spaced wall 68 and 70 respectively of each support structure 48 are arcuate. The third and fourth circumferentially spaced walls 68 and 70 are concave, e.g. the third and fourth walls 68 and 70 curve towards each other. The third and fourth walls 68 and 70 are arcuate, or shaped, to fit circumferentially between the planet gears 32 of the gearbox 30.

The support structures 48 axially space apart the first and second rings 42 and 44 of the planet carrier 34. The support structures 48 connect the first and second rings 42 and 44 of the planet carrier 34. The support structures 48 collect lubricant from the planet gears 32 and/or sun gear 28 of the gearbox 30 and supply lubricant to the planet gears 32 and/or sun gear 28 of the gearbox 30. The support structures 48 form a lubricant baffle to help collect the lubricant. The support structures 48 carry loads and torque between the first and second rings 42 and 44 of the planet carrier 34. The first and second axial ends 47 and 49 of the support structures 48 locate in the recesses 50 and 52 of the first and second rings 42 and 44 respectively to provide improved location of the support structures 48 and additional load and torque carrying capability between the first and second rings 42 and 44 of the planet carrier 34. The pre-tensioned fasteners 60 provide an axial compressive load onto the first and second rings 42 and 44 and the support structures 48.

As mentioned above, the support structures 48 comprise fused, or sintered, powdered material, the support structures 48 may comprise a metal for example steel, titanium, a titanium alloy, nickel, nickel alloy, cobalt, a cobalt alloy, aluminium or aluminium alloy. The support structures 48 may comprise the same material, e.g. the same metal, as the first ring 42 and the second ring 44. The support structures 48 are manufactured by additive layer manufacturing, e.g. laser powder bed, selective laser sintering, direct laser deposition etc. of the powdered material. The support structures 48 may comprise reinforcing material. The reinforcing material may comprise ceramic particles, e.g. ceramic powder, or short fibres. A support structure 48 is built up layer by layer for example from the first axial end 47 to the second axial end 49 in order to produce a monolithic, integral, one-piece support structure 48. The additive layer manufacturing of a support structure 48 comprises building the first axial end 47, e.g. the first wall 64, and then building the second, third, fifth and sixth walls 68, 70, 72 and 74 respectively and the pillar 78 perpendicularly from the first wall 64 to the second axial end 49, e.g. the second wall 66. The additive layer manufacturing process includes not fusing, or not sintering, the powder material in appropriate locations to define the internal structure of the support structure 48. The additive layer manufacturing process includes not fusing, or not sintering, the powder material in appropriate locations to define the aperture 51, the lubricant collection passage 82, the at least one lubricant scavenge passage 84, the lubricant supply passage 86, the at least one lubricant aperture 88, the lubricant supply passage 90 and the at least one lubricant aperture 92.

The planet carrier 34 is assembled vertically by firstly arranging the first ring 42 horizontally and positioning the planet gears 32 and sun gear 28 on the first ring 42 with the teeth of the sun gear meshing with the teeth of the planet gears 32 and with the axes of the planet gears 32 aligned with the axes of the apertures in the first ring 32. The axles 46 are inserted through the planet gears 32 and the apertures 53 in the first ring 42 and the ends of the axles 46 are held in position in the first ring 42. Secondly the fasteners 60 are inserted through the apertures 41 in the first ring 42 and the first end 47 of each support structure 48 is inserted into a corresponding recess 50 in the first ring 42 and such that the associated fastener 60 is inserted through the aperture 51 in the support structure 48. Thirdly, the second ring 44 is arranged horizontally and the second ring 44 is lowered vertically such that the opposite ends of the axles 46 are inserted through the apertures 55 in the second ring 44, the second end 49 of each support structure 48 is inserted into a corresponding recess 52 in the second ring 44 and each fastener 60 is inserted through an associated aperture 45 in the second ring 44. The ends of the axles 46 are held in position in the second ring 44. The fasteners 60 are placed in tension, the nuts 62 are threaded and tightened onto the fasteners 60 and then the tension is released from the fasteners 60 to provide an axial compressive load onto the first and second rings 42 and 44 and the support structures 48 of the planet carrier 34, e.g. clamps the first and second rings 42 and 44 respectively to the support structures 48 of the planet carrier 34.

Figure 7:
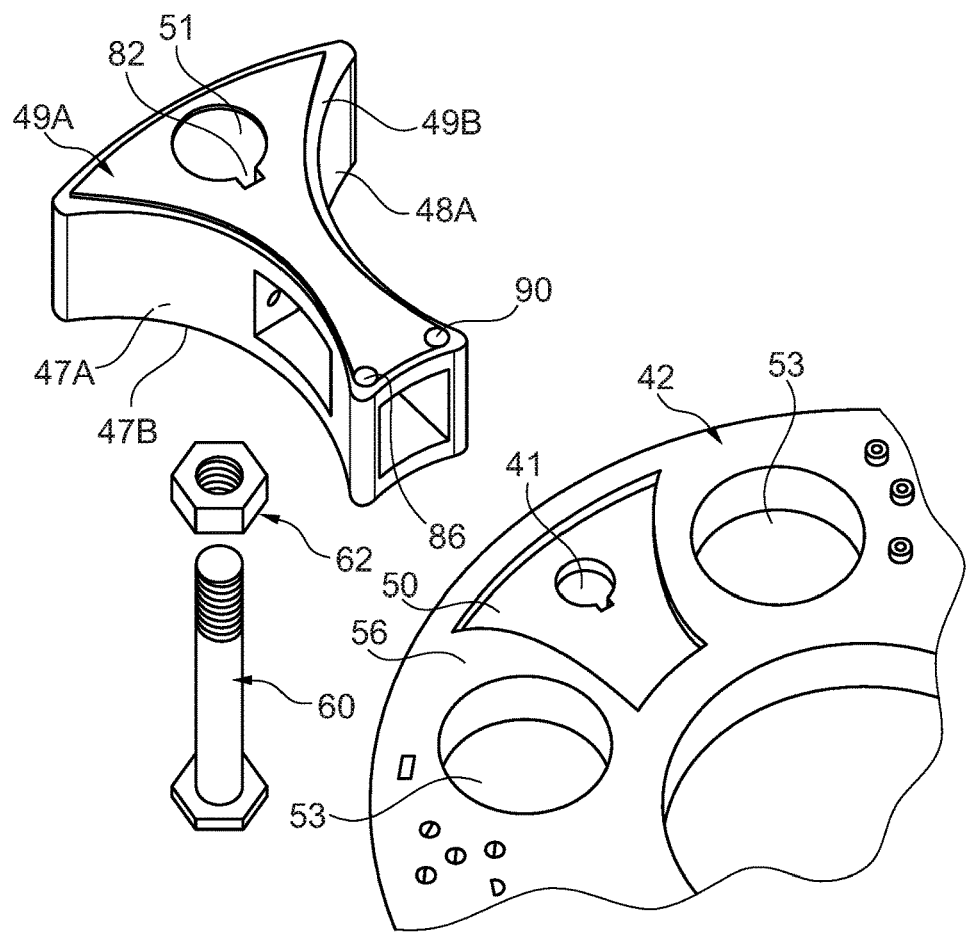
FIG. 7 is an alternative further enlarged exploded perspective view of a portion of the planet carrier of the gearbox shown in FIG. 4.

FIG. 7 shows an alternative arrangement of the planet carrier 34 of the gearbox 30. The arrangement shown in FIG. 7 is similar to the arrangement shown in FIG. 5 and like parts are denoted by like numbers. The arrangement in FIG. 7 differs in that the first and second axial ends 47A and 49A of each support structure 48A have end portions which have smaller dimensions than the remainder of the support structure 48A to define ledges 47B and 49B, and the ledges 47B and 49B abut the surfaces 56 and 58 of the first and second rings 42 and 44 respectively. A planet carrier of a gearbox may comprise a plurality of support structures as shown in FIG. 7. The first and second axial ends 47A and 49A of each support structure 48A have end portions which form plugs, the recesses 50 and 52 in the first and second rings 42 and 44 form sockets, the plugs of each support structure 48A locating in a respective one of the sockets in the first ring 42 and a respective one of the sockets in the second ring 44. In particular the first and second axial ends 47A and 49A of each support structure 48A have end portions which form tenons, the recesses 50 and 52 in the first and second rings 42 and 44 form mortices, the tenons of each support structure 48A locating in a respective one of the mortices in the first ring 42 and a respective one of the mortices in the second ring 44.

Figure 8:
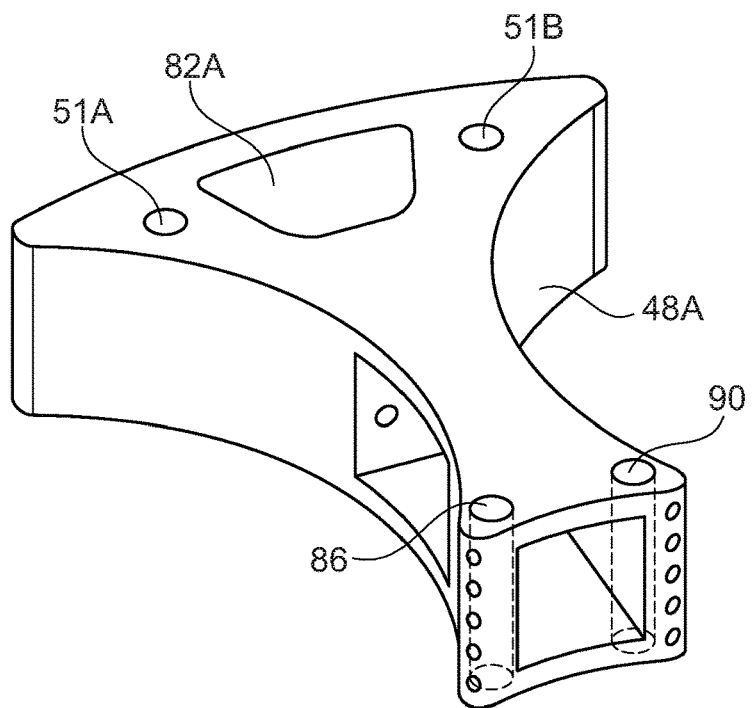
FIG. 8 is a further enlarged perspective view of a support structure for the planet carrier of the gearbox shown in FIG. 5.

FIG. 8 shows an enlarged perspective view of an alternative support structure 48B for the planet carrier of the gearbox 30. The support structure 48B shown in FIG. 8 is similar to the support structure 48 shown in FIG. 6 and like parts are denoted by like numbers. The support structure 48B is secured to the first ring 42 and the second ring 44 by two fasteners extending axially through the support structure 48B. Each support structure 48B may be secured to the first ring 42 and the second ring 44 by two pre-tensioned fasteners extending axially through the support structure 48B. Each fastener extends through a respective aperture 51A and 51B in the support structure 48 and respective apertures in the first ring 42 and the second ring 44 respectively. The fasteners may be threaded bolts and each fastener is used with a cooperating nut. The apertures 51A and 51B are circumferentially spaced apart and a separate lubricant collection passage 82A is provided circumferentially between the apertures 51A and 51B. A planet carrier of a gearbox may comprise a plurality of support structures 48B as shown in FIG. 8.

Figure 9:
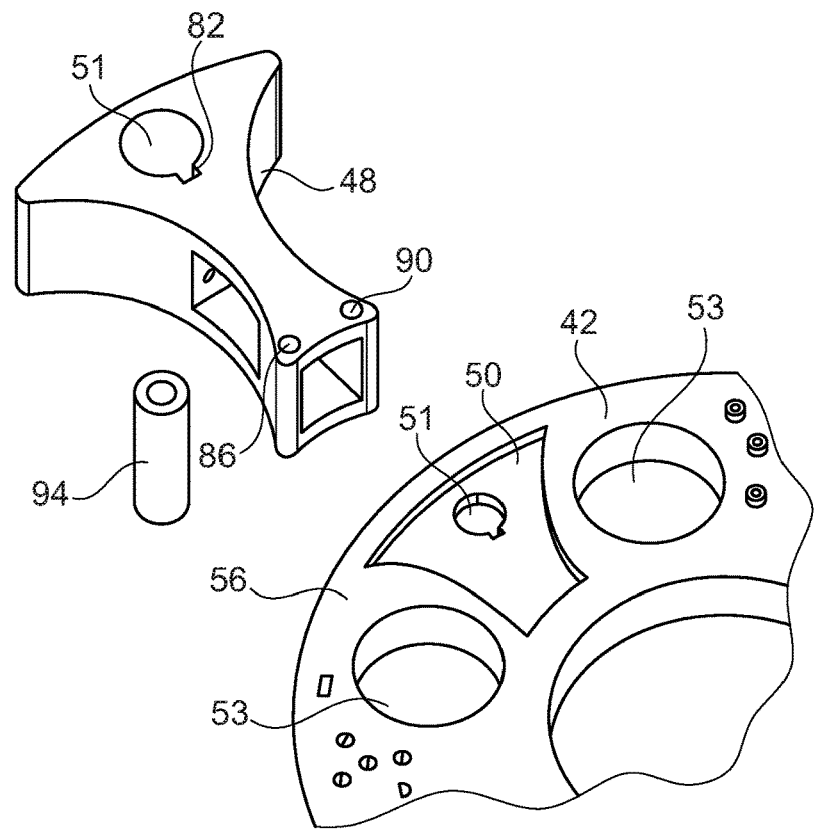
FIG. 9 is an alternative further enlarged exploded perspective view of a portion of the planet carrier of the gearbox shown in FIG. 4.

FIG. 9 shows an alternative arrangement of the planet carrier 34 of the gearbox 30. The arrangement shown in FIG. 9 is similar to the arrangement shown in FIG. 5 and like parts are denoted by like numbers. The arrangement in FIG. 9 differs in that the support structure 48 is secured to the first ring 42 and the second ring 44 by a least one metal matrix composite tube 94 which extends axially through the support structure 48. The metal matrix composite tube 94 extends through the aperture 51 in the support structure 48. The axial ends of the metal matrix composite tube 94 are located in respective apertures 41 and 45 in the first ring 42 and the second ring 44 respectively. The axial ends of the metal matrix composite tube 94 are secured to the first ring 42 and the second ring 44, for example by welding or by brazing. The axial ends of the metal matrix composite tube 94 may be secured to the first ring 42 and the second ring 44 using a fastener which extends axially through the metal matrix composite tube 94 and the support structure 48 and a cooperating nut in a similar manner to that of the arrangement shown in FIG. 5. The lubricant collection passage 82 is defined by the axially extending groove extending radially from the aperture 51 and a radially outer surface of the metal matrix composite tube 94. The metal matrix composite tubes 94 increases the stiffness, loan and torque carrying capability of the support structures 48 between the first and second rings 42 and 44 of the planet carrier 34. The metal matrix composite tubes 94 comprise continuous longitudinally, axially, extending fibres in a metal matrix. The metal matrix may be steel, titanium, a titanium alloy, nickel, nickel alloy, cobalt, a cobalt alloy, aluminium or aluminium alloy. The reinforcing fibres may be silicon carbide fibres, silicon nitride fibres or boron nitride fibres.

Figure 10:
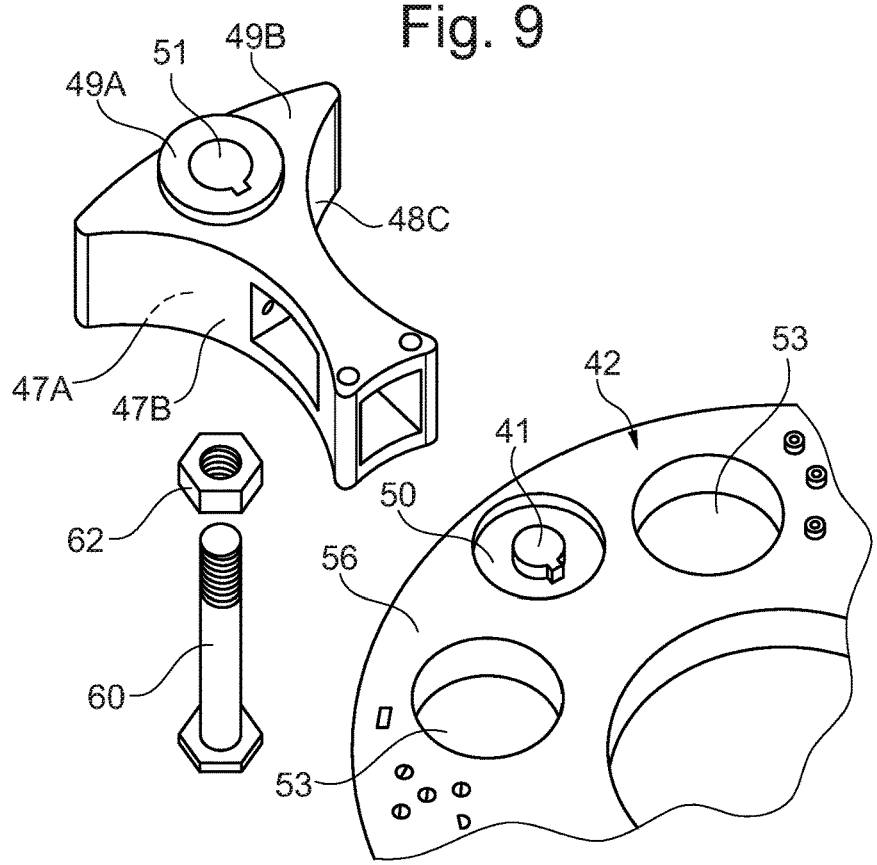
FIG. 10 is an alternative further enlarged exploded perspective view of a portion of the planet carrier of the gearbox shown in FIG. 4.

FIG. 10 shows an alternative arrangement of the planet carrier 34 of the gearbox 30. The arrangement shown in FIG. 9 is similar to the arrangement shown in FIG. 7 and like parts are denoted by like numbers. The arrangement in FIG. 10 differs in that the first and second axial ends 47A and 49A of each support structure 48C have end portions which have smaller dimensions than the remainder of the support structure 48C to define ledges 47B and 49B, and the ledges 47B and 49B abut the surfaces 56 and 58 of the first and second rings 42 and 44 respectively. A planet carrier of a gearbox may comprise a plurality of support structures as shown in FIG. 10. The first and second axial ends 47A and 47B of each support structure 48C are circular in cross-section and are arranged to locate in circular cross-section recesses 50 in the first and second rings 42 and 44. The first and second axial ends 47A and 49A of each support structure 48A have end portions which form plugs, the recesses 50 and 52 in the first and second rings 42 and 44 form sockets, the plugs of each support structure 48A locating in a respective one of the sockets in the first ring 42 and a respective one of the sockets in the second ring 44. In particular, the plugs and sockets are of the bayonet type in which each support structure 48C is rotatable about an axis parallel to the axis of the first and second rings 42 and 44 to lock the support structure 48C in position.

Referring again to FIG. 4, it is noted that a first shaft 96 extends coaxially from the first ring 42. The first shaft 96 comprises the same material as the first ring 42. A composite material is arranged around and abutting the first shaft 96. The composite material comprises a plurality of continuous reinforcing fibres extending circumferentially around the first shaft 96. The composite material may comprise carbon fibres, a carbon fibre weave or a Kevlar® fibre weave in a resin matrix.

Alternatively, the first shaft 96 may comprise a metal matrix composite. The metal matrix may be steel, titanium, a titanium alloy, nickel, nickel alloy, cobalt, a cobalt alloy, aluminium or aluminium alloy. The reinforcing fibres may be silicon carbide fibres, silicon nitride fibres or boron nitride fibres. The first shaft 96 extends in a downstream direction from the planet carrier 34 and is rotatably mounted in static structure of the gas turbine engine 10 by a bearing. A second shaft 98 extends coaxially from the second ring 44. The second shaft 98 comprises the same material as the second ring 44. A composite material is arranged around and abutting the second shaft 98. The composite material comprises a plurality of continuous reinforcing fibres extending circumferentially around the second shaft 98. The composite material may comprise carbon fibres, a carbon fibre weave or a Kevlar® fibre weave in a resin matrix. Alternatively, the second shaft 98 comprises a metal matrix composite. The metal matrix may be steel, titanium, a titanium alloy, nickel, nickel alloy, cobalt, a cobalt alloy, aluminium or aluminium alloy. The reinforcing fibres may be silicon carbide fibres, silicon nitride fibres or boron nitride fibres. The second shaft 98 extends in an upstream direction from the planet carrier 34 and is rotatably mounted in static structure of the gas turbine engine 10 by a bearing and defines a portion of the linkage 36 to the fan 23.

Each fastener may comprise a metal for example steel, titanium, titanium alloy, nickel, nickel alloy, cobalt or cobalt alloy. Each fastener may comprise a metal matrix composite for example steel, titanium, titanium alloy, nickel, nickel alloy, cobalt or cobalt alloy metal matrix composite.

Figure 4:
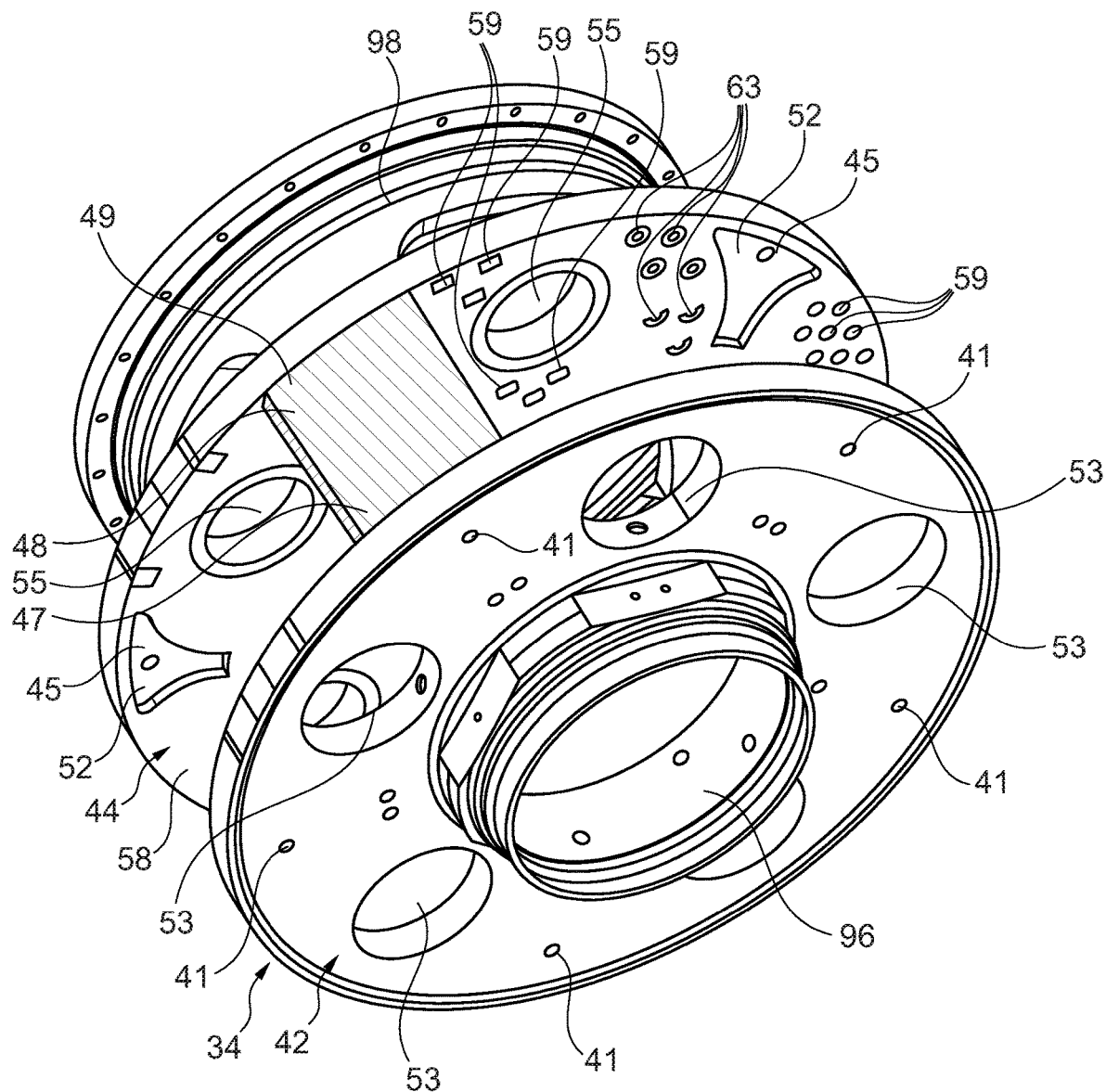
FIG. 4 is an enlarged perspective view of a planet carrier of the gearbox shown in FIG. 3.

The first ring 42 may have a plurality of indentations, or dimples, 57 in the surface 56 facing the second ring 44 and/or the second ring 44 may have a plurality of indentations, or dimples, 59 in the surface 58 facing the first ring 42, as shown in FIGS. 4 and 5. The indentations 57 and 59 may be circular in cross-section. The indentations 57 and 59 may have a constant radius throughout their depth. The indentations 57 and 59 may have an increasing radius with increasing depth. The indentations may have other shapes, e.g. arcuate, half circular or rectangular etc. The arcuate and half circular indentations 57 and 59 may have their concave surface facing away from the axis of the first ring 42 and/or the second ring 44. The first ring 42 may have a plurality of projections 61 extending from the surface 56 facing the second ring 44 and/or the second ring 44 may have a plurality of projections 63 extending away from the surface 58 facing the first ring 42, as shown in FIGS. 4 and 5. The first ring 42 may have a plurality of cup shape projections 61 extending from the surface 56 facing the second ring 44 and/or the second ring 44 may have a plurality of cup shape projections 63 extending away from the surface 58 facing the first ring 42. The projections 61 and 63 may be circular in cross-section. The projections 61 and 63 may have a constant internal radius throughout their depth. The projections 61 and 63 may have an increasing internal radius with increasing depth. The first ring 42 may have a plurality of arcuate projections 61 extending from the surface 56 facing the second ring 44 and/or the second ring 44 may have a plurality of arcuate projections 63 extending away from the surface 58 facing the first ring 42. The arcuate projections 61 and 63 may have a concave surface facing away from the axis of the first ring 42 and/or the second ring 44. The indentations 57 and 59 and/or the projections 61 and 63 are arranged to retain a predetermined, measured, amount of lubricant when the gas turbine engine 10 and the gearbox 30 is not in use. The lubricant retained in the indentations 57 and 59 and/or the projections 61 and 63 provide lubricant during dry starting of the gearbox 30 and ground wind-milling of the gas turbine engine 10 by supplying the lubricant retained in the indentations 57 and 59 and/or the projections 61 and 63 to the sun gear 28, the planet gears 32 and the annulus gear 38 due to the lubricant being centrifuged out of/off the indentations 57 and 59 and/or the projections 61 and 63 during start-up of the gearbox 30 and ground wind-milling of the gas turbine engine 10. The predetermined amount is the minimum amount of lubricant required during dry starting or wind-milling. The indentations 57 and 59 and/or the projections 61 and 63 are arranged so as to not retain too much lubricant when the gas turbine engine 10 and gearbox 30 is not in use. The indentations 57 and 59 and/or the projections 61 and 63 may also be positioned radially and/or circumferentially so as to balance the first ring 42 and/or the second ring 44 and/or the planet carrier 34 as a whole unit.

Although the present disclosure has referred to the recesses extending only part way axially through first ring and the second ring it may be possible for the recesses to extend axially all the way through the first ring and the second ring. In such circumstances the support structures may be secured to the first and second rings by bonding, welding, brazing etc.

A geared gas turbine engine according to the present disclosure provides a planet carrier which has reduced weight, up to about 30% less weight than a conventional all metal planet carrier, and the planet carrier has similar or increased strength and stiffness compared to a conventional all metal planet carrier.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gearbox comprising a sun gear, a plurality of planet gears, an annulus gear and a planet carrier, the sun gear meshing with the planet gears and the planet gears meshing with the annulus gear, the planet carrier comprising a first ring, a second ring spaced axially from the first ring, a plurality of circumferentially spaced axles extending axially between the first ring and the second ring and a plurality of circumferentially spaced support structures extending axially between the first ring and the second ring, each planet gear being rotatably mounted on a respective one of the axles, each support structure being arranged circumferentially between two planet gears, the first ring has a plurality of circumferentially spaced recesses in a surface facing the second ring, the second ring has a plurality of circumferentially spaced recesses in a surface facing the first ring, each recess in the second ring being aligned circumferentially and radially with a corresponding one of the recesses in the first ring, a first axial end of each support structure locating in a respective one of the recesses in the first ring, a second axial end of each support structure locating in a respective one of the recesses in the second ring, each support structure being secured to the first ring and the second ring, each support structure is secured to the first ring and the second ring by at least one fastener extending axially through the support structure, each support structure has one or more internal passages for the supply of lubricant to the planet gears and/or the sun gear of the gearbox and one or more internal passages for the collection of lubricant from the planet gears and/or the sun gear of the gearbox, each support structure comprising fused/sintered powdered material and the support structures are manufactured by additive layer manufacturing.

2. A gearbox as claimed in claim 1 wherein the first ring comprises a metal or a metal matrix material comprising reinforcing particles in a metal matrix.

3. A gearbox as claimed in claim 1 wherein the first ring comprises steel, titanium, a titanium alloy, nickel, nickel alloy, cobalt, a cobalt alloy, aluminium, an aluminium alloy or an aluminium metal matrix composite.

4. A gearbox as claimed in claim 1 wherein the second ring comprises a metal or a metal matrix material comprising reinforcing particles in a metal matrix.

5. A gearbox as claimed in claim 1 wherein the second ring comprises steel, titanium, a titanium alloy, nickel, nickel alloy, cobalt, a cobalt alloy, aluminium, an aluminium alloy or an aluminium metal matrix composite.

6. A gearbox as claimed in claim 1 wherein a first shaft extends axially from the first ring.

7. A gearbox as claimed in claim 6 wherein the first shaft comprises a metal matrix composite or a composite material is arranged around and abutting the first shaft.

8. A gearbox as claimed in claim 1 wherein a second shaft extends axially from the second ring.

9. A gearbox as claimed in claim 8 wherein the second shaft comprises a metal matrix composite or a composite material is arranged around and abutting the second shaft.

10. A gearbox as claimed in claim 1 wherein the support structures comprise a metal.

11. A gearbox as claimed in claim 1 wherein the support structures comprise steel, titanium, a titanium alloy, nickel, nickel alloy, cobalt, a cobalt alloy, aluminium or an aluminium alloy.

12. A gearbox as claimed in claim 1 wherein each support structure is secured to the first ring and the second ring by at least one pre-tensioned fastener extending axially through the support structure.

13. A gearbox as claimed in claim 1 wherein each fastener extends through a respective aperture in the support structure and respective apertures in the first ring and the second ring.

14. A gearbox as claimed in claim 1 wherein each support structure is secured to the first ring and the second ring by a least one metal matrix composite tube extending axially through the support structure.

15. A gearbox as claimed in claim 14 wherein each metal matrix composite tube extends through a respective aperture in the support structure.

16. A gearbox as claimed in claim 1 wherein the first and second axial ends of each support structure have end portions which have smaller dimensions than the remainder of the support structure to define ledges, and the ledges abut the surfaces of the first and second rings.

17. A gearbox as claimed in claim 1 wherein each support structure is generally wedge shaped in cross-section in a plane perpendicular to the axis of the gearbox.

18. A gearbox as claimed in claim 1 wherein each support structure comprises first and second axially spaced walls, third and fourth circumferentially spaced walls interconnecting the first and second walls, fifth and sixth radially spaced walls interconnecting the first and second walls and interconnecting the third and fourth walls, the fourth wall being longer than the third wall and extending radially inwardly of the sixth wall to define a lubricant baffle, a pillar interconnecting the first and second walls, the pillar being spaced radially from a radially inner end of the third wall, the pillar being spaced circumferentially from a radially inner end of the fourth wall to define a lubricant collection chamber.

19. A gearbox as claimed in claim 18 wherein each support structure having a lubricant collection passage extending axially there-through and at least one lubricant scavenge passage extending from the lubricant collection passage to an opening in the sixth wall.

20. A gearbox as claimed in claim 18 wherein each support structure having a lubricant supply passage extending axially through the pillar, and at least one lubricant aperture extending from the lubricant supply passage to a surface of the pillar facing a planet gear of the gearbox and/or a surface of the pillar facing the sun gear of the gearbox.

21. A gearbox as claimed in claim 18 wherein each support structure having a lubricant supply passage extending axially through a radially inner end of the fourth wall, and at least one lubricant aperture extending from the lubricant supply passage to a surface of the fourth wall facing a planet gear of the gearbox and/or a surface of the fourth wall facing the sun gear of the gearbox.

22. A gas turbine engine for an aircraft comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft, wherein:
the gearbox comprising a sun gear, a plurality of planet gears, an annulus gear and a planet carrier, the sun gear meshing with the planet gears and the planet gears meshing with the annulus gear, the planet carrier comprising a first ring, a second ring spaced axially from the first ring, a plurality of circumferentially spaced axles extending axially between the first ring and the second ring and a plurality of circumferentially spaced support structures extending axially between the first ring and the second ring, each planet gear being rotatably mounted on a respective one of the axles, each support structure being arranged circumferentially between two planet gears, the first ring has a plurality of circumferentially spaced recesses in a surface facing the second ring, the second ring has a plurality of circumferentially spaced recesses in a surface facing the first ring, each recess in the second ring being aligned circumferentially and radially with a corresponding one of the recesses in the first ring, a first axial end of each support structure locating in a respective one of the recesses in the first ring, a second axial end of each support structure locating in a respective one of the recesses in the second ring, each support structure being secured to the first ring and the second ring, each support structure is secured to the first ring and the second ring by at least one fastener extending axially through the support structure, each support structure has one or more internal passages for the supply of lubricant to the planet gears and/or the sun gear of the gearbox and one or more internal passages for the collection of lubricant from the planet gears and/or the sun gear of the gearbox, each support structure comprising fused/sintered powdered material and the support structures are manufactured by additive layer manufacturing.

* * * * *